United States Patent Office
2,769,803
Patented Nov. 6, 1956

2,769,803

COPOLYMERS OF VINYL CHLORIDE AND 1.1-DICHLORO-ETHENE

Wilhelm Becker, Leverkusen-Bayerwerk, Germany, assignor to Farbenfabriken Bayer Aktiengesellschaft, Leverkusen, Germany, a corporation of Germany No Drawing. Application March 31, 1953,
Serial No. 346,021

Claims priority, application Germany April 17, 1952

4 Claims. (Cl. 260—80.5)

The present invention relates to copolymers of vinyl chloride and 1.1-dichloro-ethene and to a process of preparing such copolymers.

The polymers of vinyl chloride and those of 1.1-dichloro-ethene are insoluble or difficultly soluble in the usual solvents. It is known that the solubility properties of the single components can be improved by copolymerization of vinyl chloride and 1.1-dichloro-ethene. The copolymers thus obtained, however, are not useful as starting material for lacquers since the solutions of the copolymers mostly yield turbid films after evaporation of the solvent. Furthermore, their compatibility with the materials commonly applied in the lacquer industry, for instance linseed oil, wood oil and alkyd resins, is not satisfactory apart from the fact that the solutions lead to difficulties in the preparation of paints because of their fiber-forming properties.

In accordance with the present invention we have found that copolymers of vinyl chloride and 1.1-dichloro-ethene, which are particularly suitable for making lacquers, can be obtained by adding small quantities of a third polymerizable vinyl compound and carrying out the polymerization in the presence of regulating agents. Examples of polymerizable vinyl compounds are acrylic acid esters and methacrylic acid esters, vinyl esters, vinyl ethers and acrylonitrile. Styrene and its derivatives have proved to be especially useful in carrying out the invention. The quantities of the aforesaid polymerizable vinyl compounds to be added should amount to at least 1 percent, but should not exceed 25 percent of the combined weight of vinyl chloride and 1.1-dichloro-ethene. The best results are obtained by the addition of 5 percent.

Suitable regulating agents for the emulsion polymerization are the compounds generally known for this purpose. Especially useful are sulfur compounds such for example as the dialkyl xanthogen disulfides and aliphatic chlorinated hydrocarbons such as chloroform and carbon tetrachloride. The quantity of the regulating agent to be added depends upon the degree of viscosity desired in the end product; in general, the quantities of for instance dialkyl xanthogen disulfide may vary within the range of 0.05 to 0.5 percent.

The ratio of vinyl chloride to 1.1-dichloro-ethene may vary in wide limits, but the resulting copolymer should contain at least 15 percent of vinyl chloride or at least 15 percent of 1.1-dichloro-ethene. It has proved to be especially advantageous to use vinyl chloride and 1.1-dichloro-ethene in equal proportions by volume.

Depending on the polymerization conditions and the chosen proportions of vinyl chloride and dichloro-ethene the solutions prepared from the isolated copolymers show a higher or lower content of swelling substances. In these cases the latices obtained after polymerization are preferably subjected to an acid after-treatment with water-soluble, substantially dissociated acids, preferably at temperatures above 50° C.

After the polymerization is complete the latex is preferably adjusted to neutrality and the polymer is precipitated by addition of electrolytes or alcohols. Stabilizers, such as are known for polymers containing chlorine, can be added to the latex. It is likewise possible to incorporate the stabilizers with the isolated products.

The new copolymers obtained by the hereindescribed process show excellent solubility properties. They yield perfectly clear solutions in aromatic solvents, ketones and esters. Mixtures of solvents need not be used. The solutions show no fiber-forming properties and yield clear films of high elasticity and high hardness after evaporation of the solvents. The polymers are compatible with linseed oil, linseed oil varnish, wood oil and alkyd resins of all kinds, colophony/maleic acid resins and xylene/formaldehyde resins. They may be combined with the chlorination products of natural rubber and show an essential similarity to these products, but the films prepared from the new copolymers are superior in their elasticity and hardness. Above all, the extraordinarily high brightness of the solutions prepared from the polymers obtained according to the new process, as well as of the films and coatings prepared from these solutions, should be emphasized.

The polymers obtained according to the invention are not only useful in the form of solutions for making lacquers, but the latices may find application as such as emulsion lacquers after addition of plasticizers or dyestuffs.

The invention is further illustrated by the following examples, the parts being by weight:

*Example 1*

429 parts of vinyl chloride, 513 parts of 1.1-dichloro-ethene and 45 parts of styrene are emulsified in an autoclave in a solution of 50 parts of the sodium salt of the sulfonic acids of long-chain paraffins in 1100 parts of water under a stream of nitrogen. 2 parts of sodium pyrophosphate are added to stabilize the emulsion. After addition of 10 parts of potassium persulfate and 1 part of diisopropyl xanthogen disulphide, the emulsion is heated to 45° C., the polymerization starting after a short latent period. After the polymerization of 25 or 50 or 75 percent of the monomers, one part of diisopropyl xanthogen disulphide is introduced under pressure. The polymerization is practically complete after 70 hours. The latex thus obtained is particularly suitable as such for making paints for use on brickworks, concrete or wood, after addition of 30 parts of benzyl-p-hydroxy-diphenyl-polyglycolether.

The product is isolated by adjusting the latex to pH 7 and mixing while stirring with 5 parts of phenoxypropene oxide for 24 hours. By addition of a sodium chloride solution a finely divided polymer containing 63.9 percent of chlorine is obtained. The polymer, which has the K-value 36, gives clear solutions in aromatic solvents, esters, ketones and chlorinated hydrocarbons and is excellently compatible with drying oils, artificial and synthetic resins.

*Example 2*

A copolymer is prepared as described in Example 1, but using the following proportions of the components:

220 parts of vinyl chloride, 600 parts of dichloroethene and 50 parts of styrene. The product obtained has a chlorine content of 65 percent, yields clear solutions and is excellently compatible.

*Example 3*

475 parts of vinyl chloride, 580 parts of 1.1-dichloro-ethene and 50 parts of styrene are emulsified with the addition of 250 parts of chloroform in a solution of 60 parts of paraffin sulfonate in 1500 parts of water. The polymerization is initiated by the addition of 10 parts of potassium persulfate at 40° C. After 90 hours 850 parts of the polymer, having the K-value 38, are obtained. The product gives clear solutions and is excellently compatible.

The solutions and the films and coatings prepared therefrom are especially distinguished by their clearness and brightness.

I claim:

1. A process for the production of coplymers which comprises emulsifying at least 15% vinyl chloride, at least 15% 1.1-dichloro-ethene and 1-25% styrene, said percentages being calculated on the total weight of said monomers, in an aqueous medium and copolymerizing said monomers in a single step in the presence of about 0.05 to about 0.5% of a regulating agent.

2. A process as set forth in claim 1 wherein the regulating agent is dialkyl xanthogen disulfide.

3. A process as set forth in claim 1 wherein the regulating agent is saturated aliphatic chlorinated hydrocarbon.

4. A liquid coating composition comprising, as a film forming agent, a copolymer prepared by a process which comprises emulsifying at least 15% vinylchloride, at least 15% 1.1-dichloroethene and 1-25% styrene, said percentages being calculated on a total weight of said monomers, in an aqueous medium and copolymerizing said monomers in a single step in the presence of about 0.05 to about 0.5% of a regulating agent; and a solvent for said film forming agent.

References Cited in the file of this patent

UNITED STATES PATENTS

| | | |
|---|---|---|
| 2,328,748 | Scott | Sept. 7, 1943 |
| 2,384,886 | Britton | Sept. 18, 1945 |
| 2,563,079 | Smith | Aug. 7, 1951 |
| 2,636,870 | Connors et al. | Apr. 28, 1953 |
| 2,640,050 | LeFevre et al. | May 26, 1953 |
| 2,651,626 | deNie | Sept. 8, 1953 |